US009972181B1

United States Patent
Baldwin

(10) Patent No.: US 9,972,181 B1
(45) Date of Patent: May 15, 2018

(54) CHRONOLOGICAL ACTIVITY MONITORING AND REVIEW

(71) Applicant: Vivint, Inc., Provo, UT (US)

(72) Inventor: Kenneth Baldwin, Lehi, UT (US)

(73) Assignee: Vivint, Inc., Provo, UT (US)

( * ) Notice: Subject to any disclaimer, the term of this patent is extended or adjusted under 35 U.S.C. 154(b) by 0 days. days.

(21) Appl. No.: 15/671,106

(22) Filed: Aug. 7, 2017

Related U.S. Application Data

(63) Continuation of application No. 14/251,498, filed on Apr. 11, 2014, now Pat. No. 9,728,055.

(51) Int. Cl.
| | | |
|---|---|---|
| *G08B 13/196* | (2006.01) |
| *G06F 3/0483* | (2013.01) |
| *G06F 3/0484* | (2013.01) |
| *H04N 7/18* | (2006.01) |
| *G06F 3/0488* | (2013.01) |

(52) U.S. Cl.
CPC ..... *G08B 13/19697* (2013.01); *G06F 3/0483* (2013.01); *G06F 3/0484* (2013.01); *G06F 3/04847* (2013.01); *G08B 13/1968* (2013.01); *G08B 13/19678* (2013.01); *G08B 13/19682* (2013.01); *G08B 13/19691* (2013.01); *G08B 13/19693* (2013.01); *H04N 7/181* (2013.01); *G06F 3/0488* (2013.01)

(58) Field of Classification Search
CPC ............ G06F 3/0485; G08B 13/19697; G08B 13/19693
See application file for complete search history.

(56) References Cited

U.S. PATENT DOCUMENTS

| | | |
|---|---|---|
| 6,950,989 B2 | 9/2005 | Rosenzweig et al. |
| 6,970,183 B1 | 11/2005 | Monroe |
| 6,975,220 B1 | 12/2005 | Foodman et al. |
| 8,089,563 B2 | 1/2012 | Girgensohn et al. |
| 8,200,669 B1 | 6/2012 | Iampietro et al. |
| 9,615,065 B2* | 4/2017 | Frenette ................ H04N 7/181 |
| 2006/0156246 A1* | 7/2006 | Williams .......... G06F 17/30265 |
| | | 715/764 |

(Continued)

OTHER PUBLICATIONS

Y. Sumi, M. Yano, & T. Nishida, "Analysis Environment of Conversational Structure with Nonverbal Multimodal Data", presented at 2010 Int'l Conf. on Multimodal Interfaces / Workshop on Machine Learning for Multimodal Interfaces (ICMI-MLMI '10) (Nov. 2010) (Year: 2010).*

(Continued)

*Primary Examiner* — David N Werner
(74) *Attorney, Agent, or Firm* — Holland & Hart LLP

(57) ABSTRACT

A computer-implemented method for monitoring activity at a location, provides receiving a first data signal and a second data signal, wherein the first and second data signals are related to activities detected at a location, and reproducing the first and second data signals in a chronology that indicates relative timing of receipt of the first and second data signals via a user interface. This may accelerate review and inspection of multiple data signals recorded over time, including data signals of various types. The coincidence of patterns in the data signals may be detected and brought to the user's attention for closer review, such as via transmission of a message or transmission of a segment of recorded data.

20 Claims, 11 Drawing Sheets

(56) References Cited

U.S. PATENT DOCUMENTS

| | | |
|---|---|---|
| 2006/0174302 A1 | 8/2006 | Mattern et al. |
| 2007/0182818 A1 | 8/2007 | Buehler |
| 2007/0291117 A1 | 12/2007 | Velipasalar et al. |
| 2008/0231595 A1 | 9/2008 | Krantz et al. |
| 2009/0049400 A1* | 2/2009 | Ishihara ............... G06F 3/0481 715/785 |
| 2010/0123579 A1 | 5/2010 | Midkiff |
| 2010/0185976 A1* | 7/2010 | Sadanandan ........ G06F 3/04847 715/786 |
| 2010/0205203 A1 | 8/2010 | Anderson et al. |
| 2010/0238286 A1 | 9/2010 | Boghossian et al. |
| 2011/0010623 A1* | 1/2011 | Vanslette ............. G06F 3/0485 715/704 |
| 2011/0010624 A1* | 1/2011 | Vanslette ............. G06F 3/0485 715/704 |
| 2012/0075475 A1 | 3/2012 | Mariadoss |
| 2012/0083675 A1* | 4/2012 | el Kaliouby ........... A61B 5/165 600/301 |
| 2013/0167041 A1* | 6/2013 | Huang ................. G06F 3/0485 715/753 |
| 2014/0201627 A1* | 7/2014 | Freeman ............. G06F 3/04847 715/704 |
| 2014/0245151 A1* | 8/2014 | Carter ................. G11B 27/105 715/720 |

OTHER PUBLICATIONS

Girgensohn, A. et al., "Support for Effective Use of Multiple Video Streams in Security", Proceedings of 4th ACM Int'l Workshop on Video Surveillance & Sensor Networks (VSSN '06), Oct. 2006, 19-26.

Zahariev, A., "Graphical User Interface for Intrusion Detection in Telecommunications Networks", Aalto University, Mar. 2011.

* cited by examiner

CHRONOLOGICAL ACTIVITY MONITORING AND REVIEW

CROSS-REFERENCE TO RELATED APPLICATIONS

The present application is a continuation of U.S. patent application Ser. No. 14/251,498, titled: "Chronological Activity Monitoring and Review", filed on Apr. 11, 2014. The disclosure of the application listed above is incorporated by reference herein in its entirety.

BACKGROUND

As recording equipment, computers, and other monitoring and location management solutions have become more widely available and affordable, businesses and individuals have adopted the use of this equipment for location monitoring and activity management. This activity monitoring may be pursued for a wide variety of reasons, including, for example, security, loss prevention, employee observation, quality assurance, and other purposes.

The increased availability and implementation of activity monitoring devices has brought about conditions where the amount of information collected by these devices is greater than the average user can effectively browse and manage efficiently. Sufficient personnel may not be available to monitor (or capable of monitoring) the large number of live recordings from these devices as they happen, and the volume of information may be difficult to review after-the-fact, even when played back at higher speeds.

In certain types of businesses, thefts (including employee thefts) are an unfortunately frequent occurrence, and activity monitoring equipment is used to investigate and prevent these events. However, even if owners or managers know what happened during a theft, they must often document the occurrence by referencing the monitoring equipment recordings, including many simultaneous devices' feeds. A significant time investment is required to diligently search for and find events of interest to property owners.

SUMMARY

According to at least one embodiment, a computer-implemented method for monitoring activity at a location is provided. The method may comprise receiving a first data signal and a second data signal, wherein the first and second data signals are related to activities detected at a location, and reproducing the first and second data signals in a chronology. The chronology may indicate relative timing of receipt of the first and second data signals via a user interface. The first data signal may include output from a first activity detector, and the second data signal may include output from a second activity detector. Each of the activity detectors may detect activity at the location. The two activity detectors may transduce first and second types of activity that are different from each other. At least one of the first and second activity detectors may transduce at the location light, sound pressure, and/or movement. In some cases, at least one of the activity detectors may detect a radio signal emitted from a portable device at the location, or may detect interaction of a user with a device at the location. The chronology may include a visual representation of the first and second data signals.

The method may also comprise steps of determining that a threshold condition has been met by at least one of the first and second data signals, and indicating that the threshold condition has been met by the at least one of the first and second data signals in the chronology. Additionally, the method may include receiving a time indicator via the user interface and displaying the chronology for the time indicator via the user interface. The method may also include receiving a time indicator via the user interface and transmitting at least a portion of the first and second data signals received at the time indicator.

In some embodiments, the method may further comprise receiving a plurality of data signals related to activities detected at the location, identifying a third data signal in the plurality of data signals, and reproducing the third data signal in the chronology. In this case, the chronology may indicate relative timing of receipt of the third data signal relative to the first and second data signals via the user interface. This method may also include steps of receiving a time indicator via the user interface, wherein the third data signal is identified in the plurality of data signals based on activity detected in the third data signal at the time indicator. The third data signal may also be identified in the plurality of data signals based on activity in the third data signal corresponding with activity in at least one of the first and second data signals. The third data signal may also be identified in the plurality of data signals based on being related to at least one of the first and second data signals.

According to another aspect of the invention, a computer program product for monitoring activity at a location may be provided. The computer program product may comprise a non-transitory computer-readable medium storing instructions executable by a processor to receive a first data signal and a second data signal, the first and second data signals being related to activities detected at a location; and reproduce the first and second data signals in a chronology, wherein the chronology indicates relative timing of receipt of the first and second data signals via a user interface. The first data signal may comprise output from a first activity detector and the second data signal may comprise output from a second activity detector, wherein the first and second activity detectors each detect activity at the location. In another embodiment, the instructions are further executable to receive a plurality of data signals related to activities detected at the location, identify a third data signal in the plurality of data signals, and reproduce the third data signal in the chronology. Here, the chronology may indicate relative timing of receipt of the third data signal relative to the first and second data signals via the user interface.

In another aspect of the invention, an apparatus for monitoring activity at a location may be provided which comprises a processor, a memory in electronic communication with the processor, and instructions stored in the memory. The instructions may be executable by a processor to receive a first data signal and a second data signal, the first and second data signals being related to activities detected at a location; and reproduce the first and second data signals in a chronology. The chronology may indicate relative timing of receipt of the first and second data signals via a user interface. The first data signal may comprise output from a first activity detector, and the second data signal may comprise output from a second activity detector, wherein the first and second activity detectors each detect activity at the location. In the apparatus, the instructions may be further executable to receive a plurality of data signals related to activities detected at the location, identify a third data signal in the plurality of data signals, and reproduce the third data signal in the chronology. In this case, the chronology may indicate relative timing of receipt of the third data signal relative to the first and second data signals via the user interface.

The foregoing and other features, utilities and advantages of the invention will be apparent from the following more particular description of a preferred embodiment of the invention as illustrated in the accompanying drawings.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
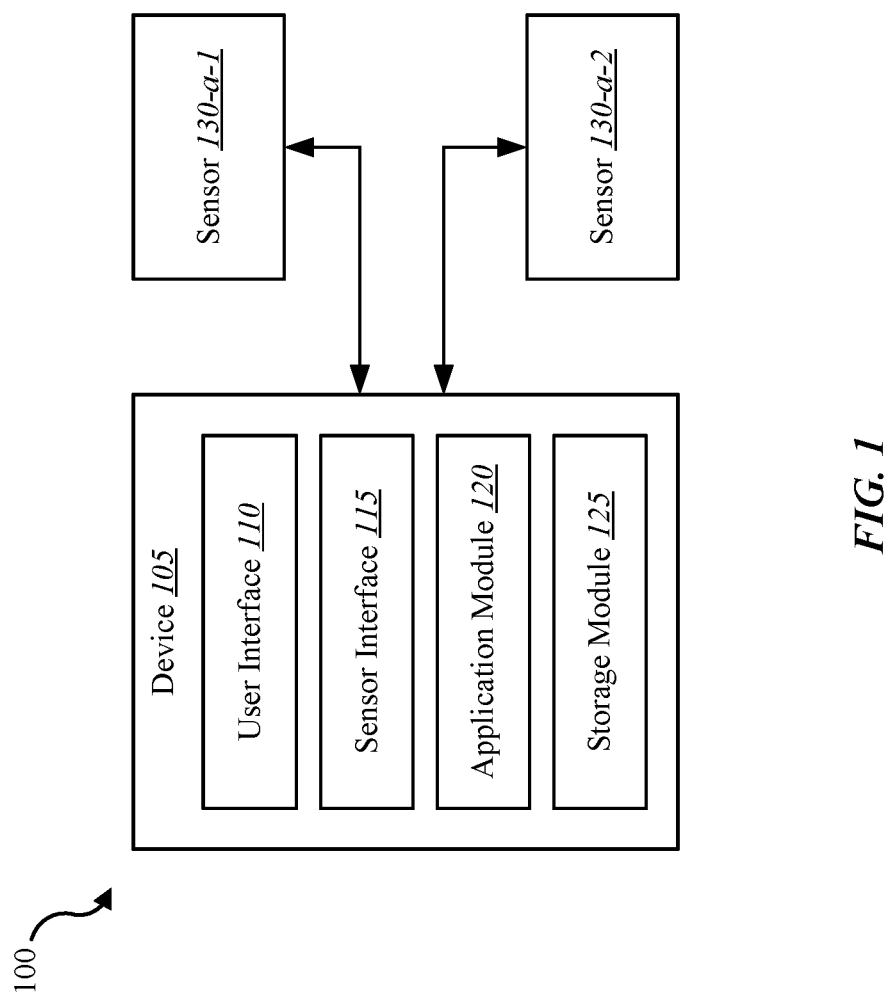
FIG. 1 is a block diagram of a system according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

According to embodiments described herein, systems and methods are provided for monitoring activities at a location which may include activity sensors or other detecting devices that are in communication with a computing device configured to receive their data signals and reproduce them in a chronology. In most cases, existing activity monitoring review solutions lack time indicators (e.g., in audio feeds), and this makes the search for an event and the analysis of the various feeds a tedious and time-consuming task. However, the chronology produced in the present systems may at least visually indicate relative timing of receipt or recording of the data signals received, thereby allowing review of many device feeds in parallel and in context of other feeds.

Some vendors provide detection of events in feeds of specific types of monitoring equipment. For example, a camera's video feeds may be monitored for movement in the field of view of the camera, and when activity is detected, it can be marked in software to bring it to the attention of a later reviewer. This technology may outright fail to detect or flag events that take place outside the field of view of the camera, though, even if other sensors are in the area that the camera monitors. The present systems may integrate in a chronology the output of video recording devices with non-video sensors and detectors (such as motion sensors, microphones, pressure sensors, position sensors, and other devices) to provide context, correlate activity detected by each sensor, and give a clearer perspective of events that happen out of view of a camera or enhance the information this is provided by a camera.

The present systems and methods may analyze the data signals collected by the sensors to automatically detect events that are likely to be significant to a reviewer, thereby accelerating review and understanding of significant events. For instance, the system may determine that a number of different related sensors simultaneously sense a level of activity exceeding a threshold activity level and either flag that incident for later review or generate and transmit an alert to a reviewer to closely review the events that triggered the alert. Information from video or audio feeds, the time in which the sensors are triggered, the employees on duty at that time, and other factors may be part of the processes by which the most significant events and activities may be detected and logged. The alert may comprise a transmitted signal that presents live or recorded sensor information to a remote user using a user interface such as, for example, a smartphone, tablet, or other computing device.

In some embodiments, the chronology is played back for a viewer via a user interface. For example, the chronology may be played back as a timeline showing time-correlated activity of various sensors at the location. The user interface may comprise controls by which the user may identify which sensor information will be most relevant, the time period to display, and other sought after settings. The systems and methods herein may intelligently determine what sensor information to display based on other sensors being concurrently triggered, user input, or other relevant factors, as described further herein infra.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Referring now to the figures in detail, FIG. 1 is a block diagram of a system 100 according to an embodiment of the present disclosure. The system 100 may comprise a computing device 105 and a plurality of sensors 130 connected to the computing device 105. The device 105 may comprise a user interface 110, sensor interface 115, application module 120, and a storage module 125.

The computing device 105 may comprise a device enabled for data computation, including a device such as a computer or server. In some embodiments the computing device 105 may be a mobile computing device such as, for instance, a notebook computer, portable phone, tablet, or related device. The computing device 105 may comprise a processor, memory, and other computer components, as described in further detail in connection with the example of FIG. 11, infra.

The user interface 110 may comprise a software and/or hardware interface by which a user may interact with or receive information from the computing device 105. Therefore, the user interface 110 may comprise a display (e.g., monitor or other screen) and other output devices, and may comprise input devices (e.g., a keyboard or touch screen sensor). The user interface may preferably comprise a display capable of reproducing video recordings and speakers capable of reproducing audio recordings. Other components that may be part of the user interface 110 are discussed below in connection with FIGS. 5-7 and 11.

The sensor interface 115 may comprise electronics for interfacing with the sensors 130 from which the computing device 105 receives data signals. Thus, the sensor interface 115 may comprise a device for wireless or wired connection to one or more sensors 130 such as an analog-digital conversion interface, wired IP interface (e.g., Ethernet), or a wireless interface such as Bluetooth®, Wi-Fi, or another system for wireless exchange of information collected by the sensors 130. In some embodiments, the sensor interface 115 may support multiple connection types, such as, for example, a wired interface connectable to a first sensor 130-$a$-1 and a radio frequency identification (RFID) interface for receiving information from a second sensor 130-$a$-2. A plurality of different connection types may be supported based on the needs of the device owner and the number and types of activities monitored at the location where the device 105 is implemented.

The application module 120 may be resident on the device 105 and capable of receiving, analyzing, and displaying data signals received via the sensor interface 115 using the user interface 110. The application module 120 may, for example, receive a video feed from a first sensor 130-$a$-1 via the sensor interface 115, store the feed using the storage module 125, and display the feed using the user interface 110. Additional functions of an application module 120 are described in connection with FIGS. 2-3 and 5-10, infra.

The storage module 125 may comprise hardware and software components for storing, indexing, and producing recorded data signals from the sensors 130. The storage module 125 may, for example, comprise a disk or computer memory device capable of writing and producing digital signals such as audio recordings, digital photographs and videos, sensor readings, related timing data, and other data signals used in monitoring activity at the location of the sensors 130.

The sensors 130 may include any sensors for monitoring specific or general activities at a location of interest. Such sensors are contemplated to include at least video cameras, light sensors, motion sensors, microphones and other audio-sensitive equipment, pressure-sensitive pads and load cells, position detectors (e.g., door position detectors or door lock position detectors), metal detectors, wireless device detectors such as radio frequency (RF) antennas (e.g., radio frequency identification (RFID), Wi-Fi, Bluetooth®, Zigbee®, near field communications (NFC), cellular (or other wireless) telecommunications devices, etc.), and like devices. The sensors 130 may be configured to output signals readable by the computing device 105 via the sensor interface 115. Preferably, the sensor output is stored and recorded by the storage module 125 in parallel with timing information that allows the recorded signal output of one sensor 130 to be later referenced relative to other signals collected simultaneously. Sensors 130 may each be one or more of many different types of detecting devices, and the sensor interface 115 may be permitted to interact with these different types of devices.

The system 100 provided in FIG. 1 may allow a user to monitor and record multiple types of sensor data simultaneously and then play back the stored signals (or user-readable interpretations thereof) in a correlated manner. This functionality quickly facilitates later review and understanding of the information stored, as described further elsewhere herein.

Figure 2:
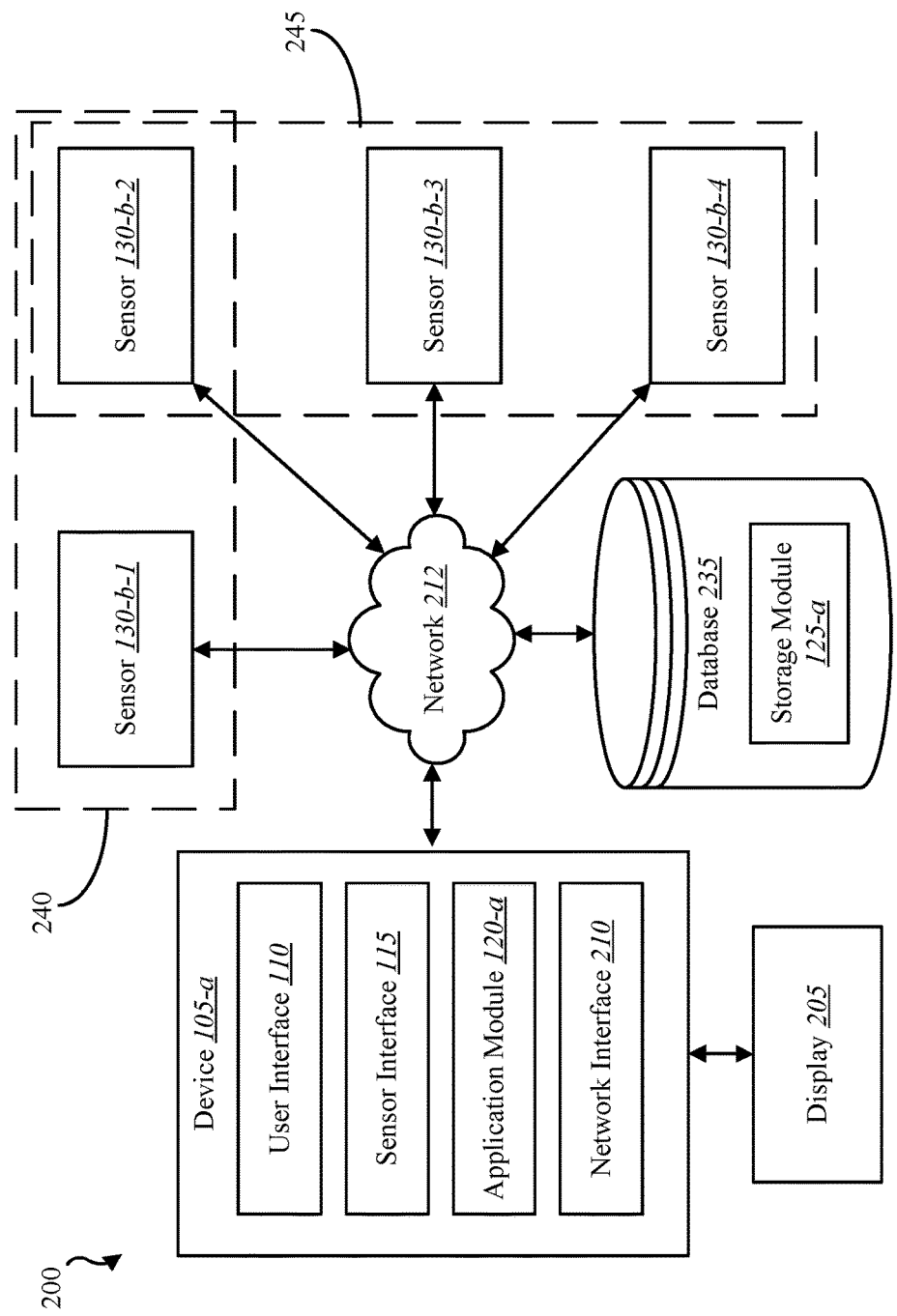
FIG. 2 is a block diagram of a system according to another embodiment of the present disclosure.

FIG. 2 is a block diagram of a system 200 according to another embodiment of the present disclosure. The block diagram illustrates how components of the system 200 may be connected through a network 212 and therefore need not all be located near to each other. A computing device 105-$a$ of the system 200 may comprise a user interface 110 and sensor interface 115 according to computing device 105 of FIG. 1. The device 105-$a$ may also comprise an application module 120-$a$ and network interface 210. The device 105-$a$ may also have a connected display 205 used in connection with, or as part of, the user interface 110. The sensor interface 115 may receive signals directly from sensors or may receive signals via the network interface 210. The device 105-$a$ may be an example of the device 105 described with reference to FIG. 1.

The application module 120-$a$ may be configured substantially similar to application module 120 of FIG. 1. In some embodiments, however, the application module 120-$a$ may be configured to interact with networked sensors 130-$b$ and a networked database 235 using the network interface 210 and network 212. The application module 120-$a$ may be adapted to identify the type and location of each sensor 130-$b$-1, 130-$b$-2, 130-$b$-3, 130-$b$-4 and associate sensors with other sensors that collect related information. For example, the application module 120-$a$ may associate the sensors into zones or groups, such as a first zone 240 having first sensors 130-$a$-1 and 130-$a$-2 and a second zone 245 having sensors 130-$b$-2. 130-$b$-3, and 130-$b$-4. When the application module 120-$a$ produces the data signals recorded from sensor 130-$b$-3, it may automatically also produce data signals recorded from the other sensors 130-$b$-2 and 130-$b$-4 in the second zone 245 to bring the information that is most likely to be relevant to the attention of the user of the computing device 105-$a$. For example, if significant activity is detected by sensor 130-$b$-3, the application module 120-$a$ may produce a chronology showing the output of sensor 130-$b$-3 and also showing the output of sensors 130-$b$-2 and 130-$b$-4 since they are all associated with the same zone 245 and would therefore be likely to also have relevant information for the user.

The network interface 210 may comprise a wired or wireless network communications interface capable of linking to the network 212 of sensors and other network connected devices (e.g., a database 235). The network interface 210 may also be configured to direct network signals to the sensor interface 115, application module 120-$a$, and user interface 110. The network 212 may comprise a computer network such as, for example, a local area network (LAN), wide area network (WAN) (e.g., the Internet), or other comparable network. The network 212 may be configured to support a common communication standard used by the network interface 210 and all other devices connected to the network 212. In some embodiments, the network 212 may support multiple communication or transmission standards. For example, some sensors may be wired to the network 212 and others may be wirelessly connected, or some sensors may connect via a multiple wireless standards such as some connecting via Wi-Fi and others connecting via a telecommunications standard such as long term evolution (LTE) or Global System for Mobile Communications (GSM). Thus, the network 212 may link a plurality of different types of sensors and other network-attached devices to the computing device 105-a to provide data signals. In some embodiments, the computing device 105-a may also provide commands to sensors 130-b or to the database 235 or storage module 125-a via the network 212. For example, the computing device 105-a may direct a motorized camera sensor to change position, zoom, or perform another action via the network 212.

The database 235 may collect the information from the plurality of sensors 130-b. Output of the sensors may be constantly provided and stored at the database 235, or may be recorded when sensor output signals trigger a predetermined minimum threshold. The database 235 may be located remote from the computing device 105-a and the sensors 130-b through the network 212. The system 200 may provide that the computing device 105-a may access the database 235 through the network 212. In other embodiments, the database 235 may be local or connected to the device 105-a. In some arrangements, the computing device 105-a may display sensor information collected by the database 235. The computing device 105-a may be granted access to specific sensors' recorded output, or may be sent all sensors' information simultaneously by the storage module 125-a.

A storage module 125-a running at the database 235 may manage the storage and recording of sensor output, such as by indexing the information or managing the amount of information stored at one time, and the storage module 125-a may also provide a server function to grant the computing device 105-a access to requested files and other information stored by the database 235. Thus, the storage module 125-a may act as a storage controller or network controller for system 200. In some embodiments, the storage module 125-a may organize data collected from the sensors into zones or regions (e.g., by zones 240, 245). The method of organization of the data may be directed by the application module 120-a according to the needs of the user of the system 200. In one example, the device 105-a may be coupled directly with the database 235, and the database 235 may be internal or external to the device 105-a.

Figure 3:
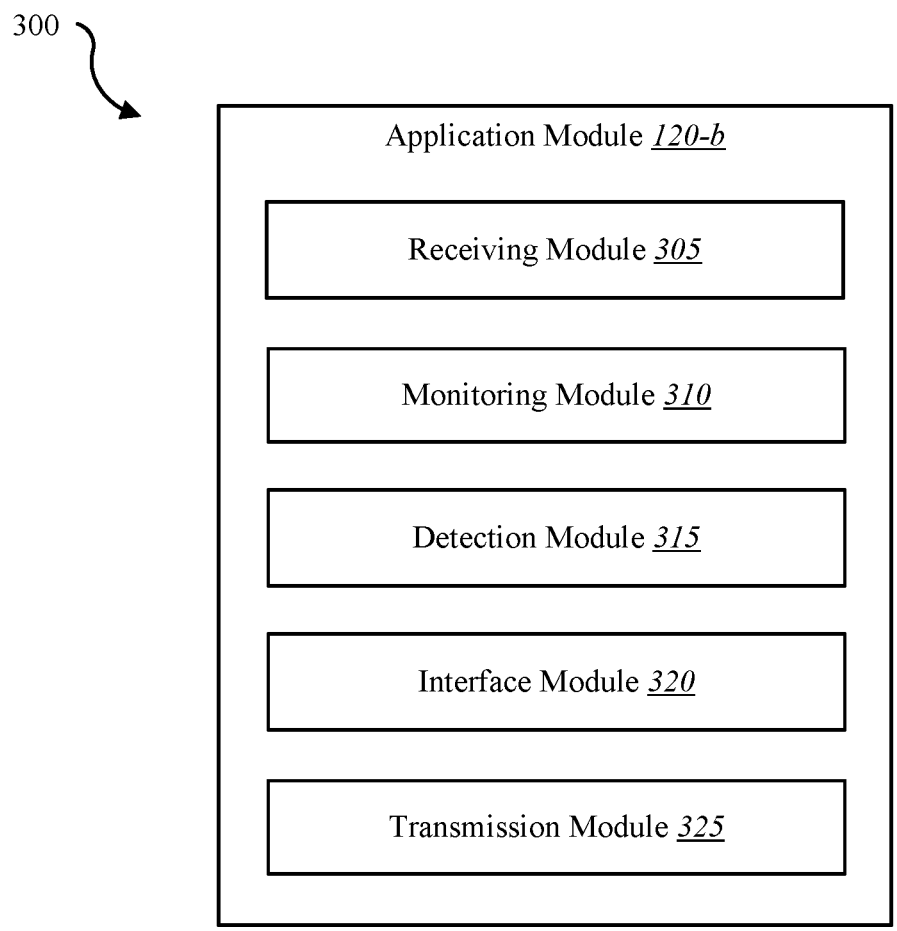
FIG. 3 is a block diagram of a module for implementing embodiments of the present systems and methods.

FIG. 3 is a block diagram of a module 300 for implementing the present systems and methods. The module 300 is an application module 120-b similar to application modules 120 and 120-a discussed previously with reference to FIGS. 1 and/or 2. The application module 120-b may be a software component running on a computing device (e.g., device 105). The application module 120-b may comprise a receiving module 305, a monitoring module 310, a detection module 315, an interface module 320, and a transmission module 325 working in conjunction with each other to fulfill the functions of the application module 120-b.

Receiving module 305 may be configured to receive data signals, such as data signals output from various sensors in the system in which the module 300 is operating. For example, the receiving module 305 may manage the communications sent or received between a device (e.g., computing device 105) and a sensor (e.g., sensors 130 in the system (e.g., systems 100, 200). The receiving module 305 may be enabled to drive and control a sensor interface (e.g., sensor interface 115) and/or a network interface (e.g., network interface 210) to receive these signals and properly route them to other modules or components. Certain data signals may be forwarded by the receiving module 305 to other components such as a storage module 125 or database 235.

An application module 120-b having monitoring module 310 may be configured to access and monitor data signals received by receiving module 305 or stored by a database connected to the device having the application module 120-b. Not all embodiments may have a monitoring module 310. The monitoring module 310 may permit the application module 120-b to determine the type of data signal received, its point of origin, timing information, and other information related to the signal. In some embodiments, the monitoring module 310 may monitor the signals by periodically measuring the signal data. This may allow the application module 120-b to detect events based on the status of the sensors being monitored using the detection module 315.

Detection module 315 may be configured to work in conjunction with the monitoring module 310 and receiving module 315 to measure the output of sensors. In this manner, the application module 120-b may determine when sensor data conditions meet predetermined conditions. For example, a microphone sensor may be received by the receiving module 305 and monitored by the monitoring module 310. The microphone may detect ambient sounds (e.g., sounds of a refrigerator, HVAC, etc.) at a certain level, and the detection module 315 may measure the signals from the microphone as being in a first condition at that point. If the microphone output increases beyond a predetermined threshold (e.g., exceeds a predetermined decibel level for a certain amount of time), the detection module 315 may register the unusual activity at a second level and, in conjunction with the interface module 320 and/or transmission module 325, may generate an alert or highlight the microphone output for a user of the system in which the application module 120-b is operating. In some embodiments, receiving any signal from a sensor may be a triggering condition for an alert or heightened activity to be indicated. In other cases, the detection module 315 may be used to detect when various signals are received coincident with each other, such as when multiple sensors in a small area (e.g., zones 240, 245) report notable activity.

Interface module 320 may be configured to display signal data collected by the receiving module 305 by generating visual and audible elements at a user interface (e.g., user interface 110 and display 205). The interface module 320 may also be configured to receive input via the user interface and control how the data signals are reproduced by the application module 120-b. In some embodiments, the interface module 320 generates a chronology showing a comparative view of multiple data signals based on the time in which they were collected, as described and depicted in greater detail in connection with FIGS. 5-7 and their related descriptions, infra. In some embodiments, the interface module 320 may be configured to receive information from the user regarding a time indicator such as an indicated span of time (e.g., a period of specific hours or days). The interface module 320 may then reproduce data signals in the chronology for the time indicator, such as signals having activities detected during a span of time or signals that correspond with unusual activity during the time indicated. The interface module 320 may also be configured to display data signals in the chronology according to detected patterns or based on the signals being part of a group or zone.

The transmission module 325 is an optional part of the application module 120-b that may interact with other portions of the application module 120-b and components of a computing device 105 on which the application module **120-*b* is resident in order to receive and send transmissions from the computing device. The transmissions managed by the transmission module 325 may comprise control signals for sensors in the network (e.g., network 212), alerts at the device on which the application module 120-*b* is operating, and/or alerts to a remote device. In one example embodiment, when the detection module 315 determines that a data signal is detected as being significant, such as when activity is detected in a secure area of the location at which activity is monitored, the transmission module 325 may be configured to prepare an alert to security personnel to review the event. The transmission module 325 may also be used to send a portion of the suspicious data signal to security personnel for immediate review. In another embodiment, certain conditions may cause the transmission module 325 to immediately trigger real-time monitoring of the data signal by transmitting it to a device. Thus, the transmission module 325** may be used to accelerate a process of identification and response to events of interest at the location being monitored.

Figure 4:
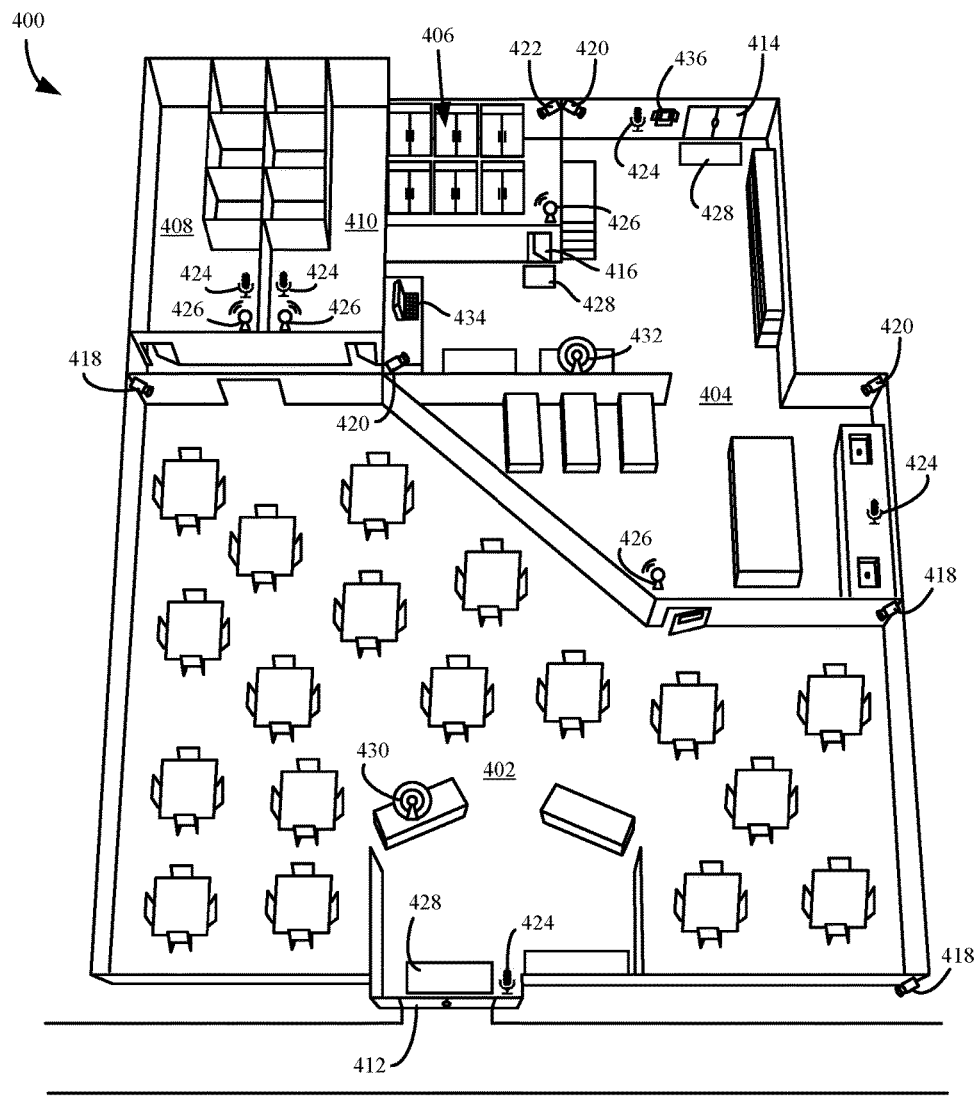
FIG. 4 is a diagram of a business location in which activity is monitored by a variety of sensors and detecting devices.

FIG. 4 is a diagram of a business location 400 in which activity is monitored by a variety of sensors and detecting devices. The location 400 may host various embodiments of the systems 100, 200 previously disclosed herein and variations thereof. The location 400 shown illustrates an exemplary embodiment of a business structure that may be monitored using the systems and methods described herein, but it is contemplated that the scope of the present disclosure may be sufficiently flexible and expandable to residential locations, government locations, properties used for other purposes, large structures, small structures, indoor locations, outdoor locations, or anywhere else activities are monitored or recorded. Furthermore, the systems and methods herein may be implemented in multiple locations simultaneously, such as where first zones of sensors are positioned at one location and second zones of sensors are positioned at another location, but they both may be accessible and monitored by a single or central device.

In the location 400 of FIG. 4, a small restaurant is shown as an example, the restaurant having a front room 402, back room 404, supply room 406, and restrooms 408, 410. The location 400 has a front door 412 and back door 414 as entry points into the front room 402 and back room 404, respectively. The supply room 406 has a supply room door 416 controlling access to the supply room 406 from the back room 404. Video cameras 418, 420, 422 are spread out strategically throughout the location 400 for video monitoring of various areas across the location 400. Other sensors at the location 400 may include audio recording devices 424, door lock sensors on the doors (e.g., at least at the front, back, and supply room doors), motion sensors 426, pressure sensor pads or tiles 428, an RFID reader 430, and a Wi-Fi router 432. These sensors may be interconnected through a network to a central control computer 434. The central control computer 434 may comprise a display, application module, and other elements described connected with device 105, supra. Thus, in this case the central control computer 434 may store and reproduce data signals from the various sensors spread throughout the location. In some embodiments, the central control computer 434 may act as a database 235 having a storage module 125.

Information may be collected and stored from each of the sensors and recording devices at the location 400. That information may then be accessed through a user interface to compare data signals collected from some sensors with others and to identify data signals that may be unusual or of other particular interest (see also FIGS. 5-7). In one example embodiment, the business operator may wish to review a suspected theft from the supply room 406 on a Sunday. The operator may therefore access the central control computer 434 and provide instructions to recall sensor data signals from the supply room 406 on the specified Sunday. The central control computer 434 may then provide a chronology of the various signals received from sensors at the supply room 406 for review and comparison. For example, the computer may provide a video feed from camera 422 and a video feed from the camera 420 facing the outside of the supply room door 416, door lock position and pressure pad 428 records for the supply room door 416, motion sensor 426 records from the supply room, and any other related information. The user may then review the related signals quickly and simultaneously to establish the circumstances of the supply room 406 at the time of the suspected theft. If the thief was not seen on camera 422, the circumstantial evidence recorded by the non-video sensors may be sufficient to narrow down or identify the thief regardless. For example, the weight of the thief may be estimated by the data from pressure pad 428, and the persons having keys to the supply room door 416 may be cross-referenced against the pressure pad to identify who the thief may be.

The system at the location 400 may also comprise means for tracking individuals such as employees who are in the building. For example, an employee time clock 436 may also be part of the system. The checking in and out of employees via the time clock 436 may be logged by the system and correlated with other information collected by the sensors. In another example, employees may be required to carry RFID devices while in the building, and the RFID reader 430 may log whether a certain RFID device is in the building at certain times. In other embodiments, one or more RFID readers may be implemented to estimate the areas of the building in which the RFID devices are detected. In such cases, employees on duty may be questioned regarding events taking place at the location 400 at a time of interest, such as when a theft occurred.

In another example embodiment, the business operator may observe and collect data regarding the quality of customer service at the location 400. The operator may therefore monitor video feeds that indicate the amount of activity outside the front door 412, how long persons stand waiting on a pressure pad 428 near the front of the building, whether customers are using the Wi-Fi 432, what customers are talking about (as recorded by audio recording equipment 424), etc. This information may be correlated in the chronology provided by the central control computer 434 to narrow down the time required to review hours of recorded data by bringing specific instances to the attention of the reviewing individual. For example, the reviewer may be alerted to instances where loud noises are detected near the front door microphone 424, the pressure pad 428 at the front door is triggered, and then the door 412 is opened and movement is detected in the outside video feed 418 within a short time. This sequence of events may indicate that a customer was upset and left the building, so such events may be quickly directed to the attention of the reviewer. The reviewer may then contact employees on duty at the time, as indicated by the time clock 434 or RFID tags active in the building.

Other such combinations of sensor readings may be devised to identify other events that are likely to be of interest to the reviewer. By detecting these events and showing them to the reviewer in a chronology, he or she may quickly sift through hours of recordings that are not important and gain a clear understanding of how events unfolded by comparing the data signals next to each other immediately.

The location 400 may be divided into zones, such as a front zone comprising the front room 402 and including front room cameras 418 and other sensors, a back zone comprising the back room 404 and including back room cameras 420 and other sensors, and a supply room zone comprising the supply room 406 and having the supply room camera 422 and other sensors. These zones may be referenced by an application module (e.g., application module 120) to index which information may be most valuable to a reviewing person. For example, if motion is detected by one of the motion detectors 426 at an unusual time, the application module may be configured to display all other sensor data collected from the zone in which the motion detector 426 is located in the chronology.

Figure 5:
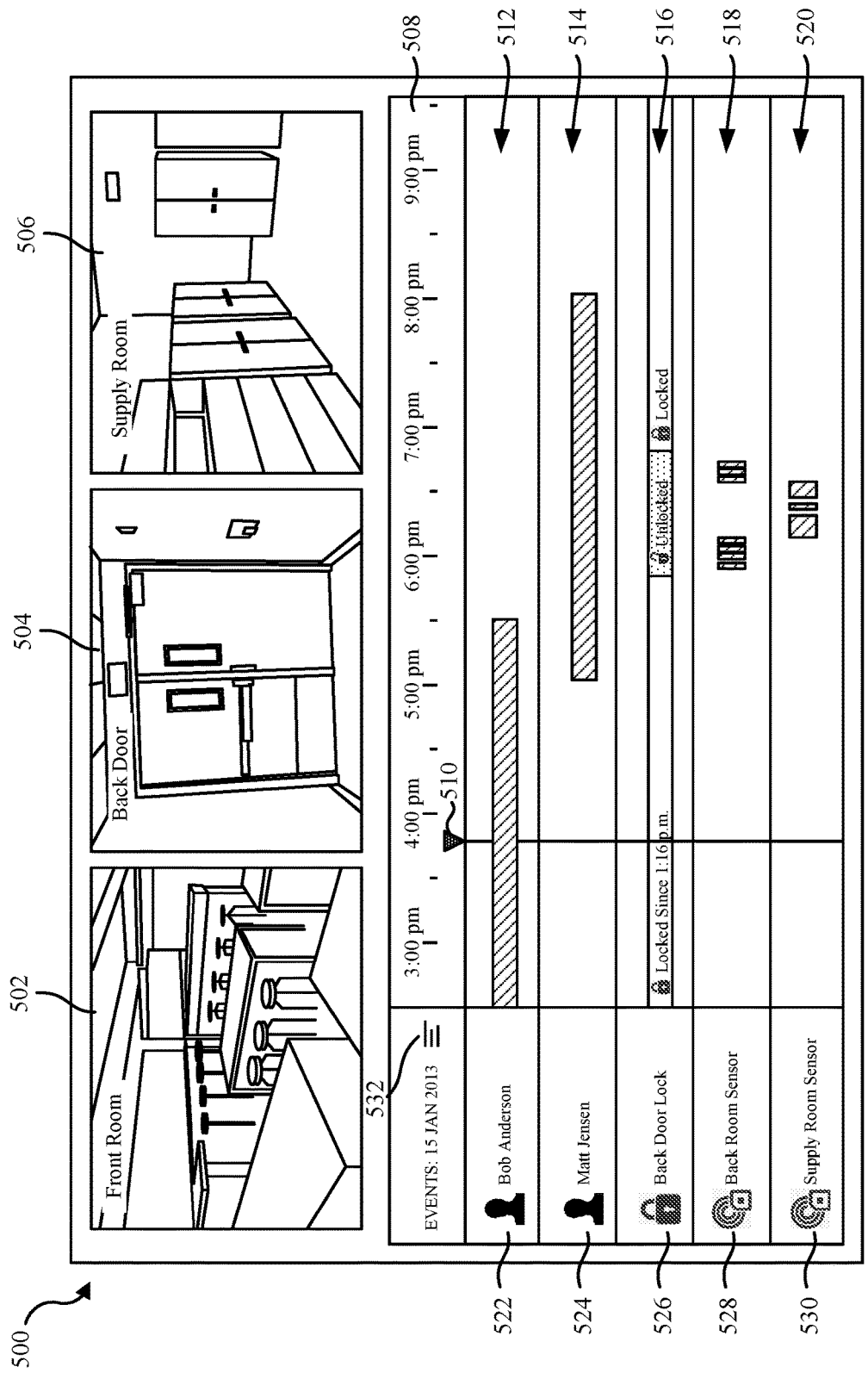
FIG. 5 is a diagram illustrating an exemplary chronology according to the present systems and methods.

FIG. 5 is a diagram illustrating an exemplary chronology 500 according to the present systems and methods. The chronology 500 may be displayed as part of a user interface (e.g., user interface 110 and display 205). The chronology 500 may comprise reproductions of video recordings 502, 504, 506. These video recordings 502, 504, 506 may be displayed simultaneously based on a time indicated by the user. The chronology 500 may comprise a timeline portion 508 indicating a span of time selected by the user and various signals over that span of time. The timeline 508 may show an indicator 510 of the exact time that the recordings 502, 504, 506 being shown were recorded. The timeline portion 508 may also display data signals 512, 514, 516, 518, 520 having labels 522,524,526,528,530. There may also be controls 532 to select which data signals to display, change labels, change the scale of the timeline 508, navigate the timeline 508, and perform other controls and actions.

To illustrate how the chronology 500 may be used, a user may access the chronology 500 and indicate a time to display on the timeline 508. In some cases, the system (e.g., an application module 120) may suggest a portion of the timeline that shows potentially interesting activity. In this case, the user may have selected 2:30 p.m. to 9:30 p.m. on January 15. The chronology 500 may therefore be populated with data signals from sensors that have correlative activities in that time period. For example, the chronology 500 may display employee clock records 512, 514, back door lock position activity 516, and back room and supply room sensor activity 518, 520. Also, the recordings captured by the front room camera 502, back door camera 504, and supply room camera 506 may be selected and shown. These data signals may be correlated by a type, intensity, or pattern in the information collected from them during the selected time period, or by being associated with each other in a zone or other location designation.

In this example, one employee clocked in at 2:30 p.m. and clocked out at 5:30 p.m., and a second employee clocked in at 5:00 p.m. and clocked out at 8:00 p.m. Thus, the time clock is used as an activity detector based on interaction of a user with the device at the location. The back door lock signal 516 shows that it was locked since 1:16 p.m. and unlocked between 5:30 p.m. and 7:00 p.m. During that same time, motion sensors in the back room and supply room detected sequential activity. In this example, the width of the sensors' bars indicate the length of time that the signals were detected. Thus, this visualization of the data signals 512 through 520 allows the user to quickly and easily compare data, the time at which the data was collected, and come to conclusions about the meaning of the data collected.

Here, the user may quickly determine that the second employee was on duty while the back door was unlocked and there was activity in the supply room via the back room, so the employee may be interviewed about the activity recorded. The user may also control playback of the video feeds 502, 504, 506 over the time period indicated (e.g., by moving the indicator 510 to a specified position) and view the camera recordings to see whether the cameras recorded other notable activity not indicated in the timeline 508. Additionally, the user may be capable of customizing the information presented in the timelines 508 through use of the controls 532 or other settings. For example, the employee information may be color-coded or shaped differently to improve readability and to differentiate between types of employees. In at least one example, an employee's information may be coded to indicate whether the employee is normally permitted access in a certain area or at a certain time. In this way, unusual activity can be quickly brought to the attention of the reviewer. In some embodiments, the user may also be able to indicate data signals to save or transmit to another device, such as a mobile device.

Figure 6:
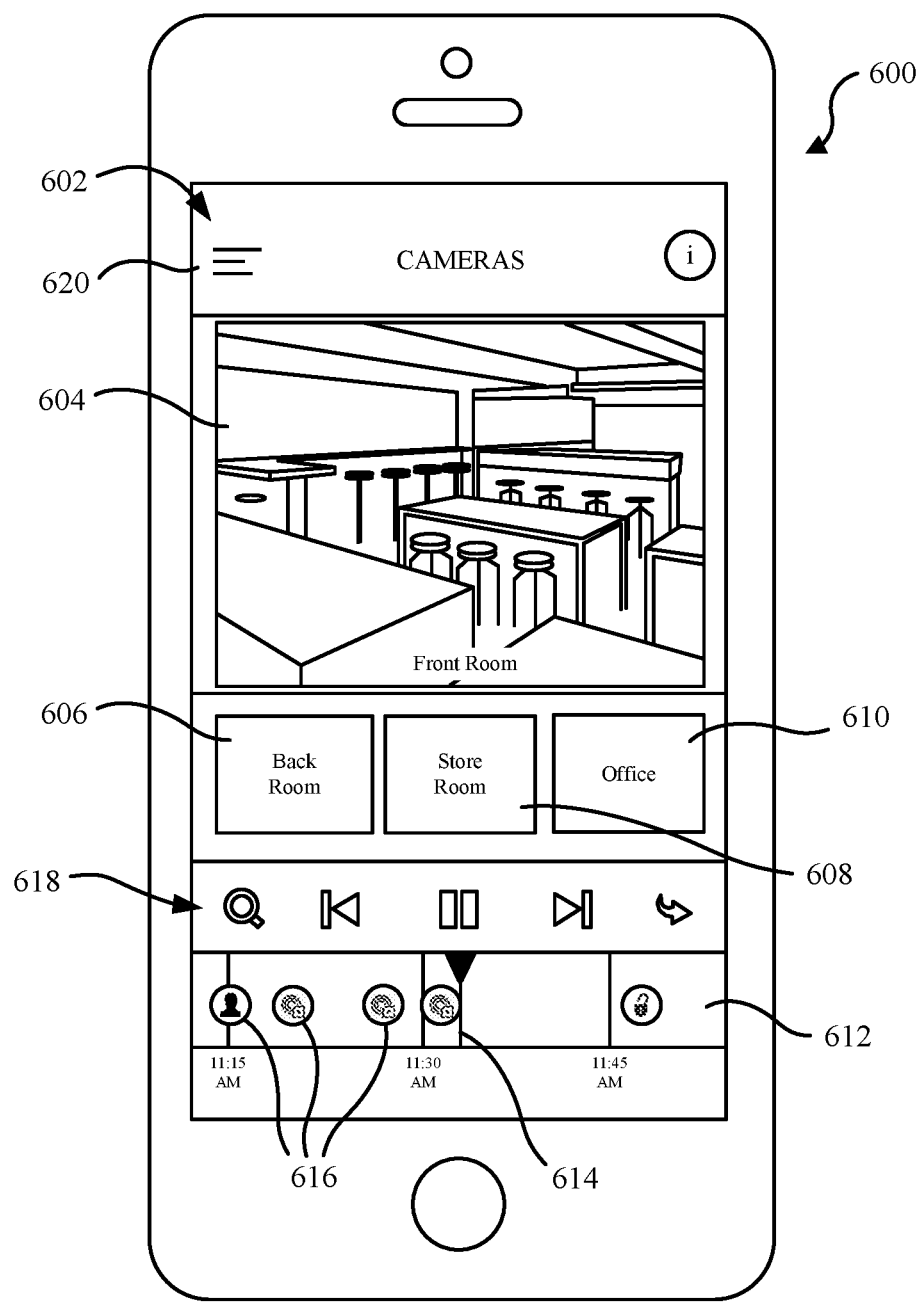
FIG. 6 is a diagram illustrating a mobile computing device displaying an exemplary chronology according to the present systems and methods.

FIG. 6 is a diagram illustrating a mobile computing device 600 displaying an exemplary chronology according to the present systems and methods. The mobile computing device 600 may display a compact chronology 602 adapted for a different display. The chronology 602 may display data signals similar to chronology 500, such as video feeds 604, 606, 608, 610, and sensor data on a timeline 612. The timeline 612 may have a time indicator 614 to show the time that the video feeds 604, 606, 608, 610 were recorded and that other sensor information 616 was gathered. The other sensor information 616 may be marked on the timeline 612 as well. In this chronology 602, the other sensor information 616 may be indicated in the same timeline 612 for multiple sensors and multiple sensor types. The chronology 602 may be configured to include playback and search controls 618 to assist the user in finding pertinent information in the recorded data signals. The search controls may allow the user to search by zone, by signal type, by time, or other criteria used to narrow down the time and place of an event of interest. Other controls 620 may allow the user to choose what information will be shown in the chronology 602, similar to the controls 532 described in connection with FIG. 5. In one embodiment, the concurrence of multiple sensors indicated by the sensor information 616 in the timeline 612 may be particularly brought to the attention of the user. The video feeds 604, 606, 608, 610 may be recorded feeds or live feeds. Some of the controls 618, 620 may allow the user to make notes or mark the timeline 612 or video feeds 604, 606, 608, 610 for later review on a full-featured computer system.

Figure 7:
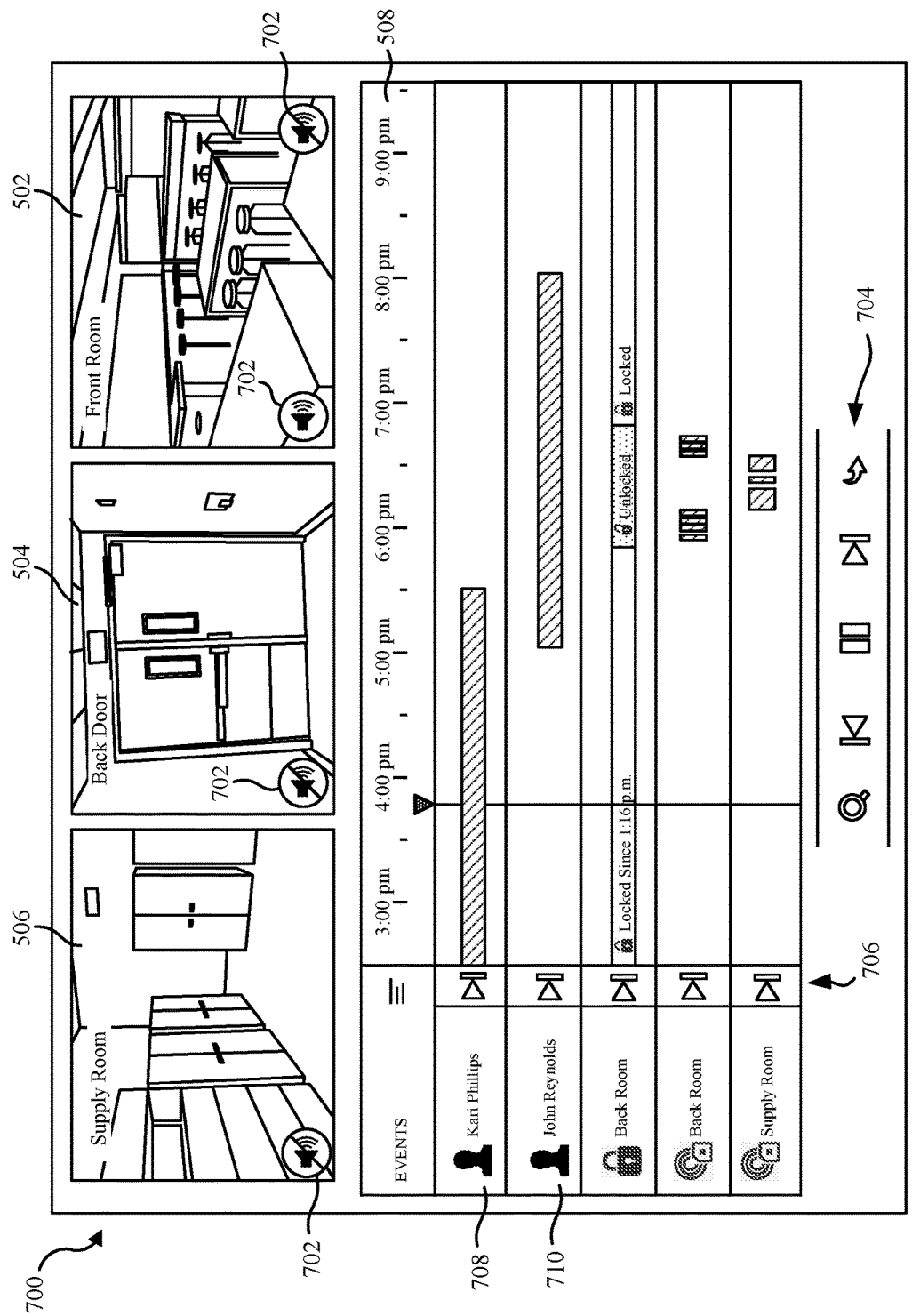
FIG. 7 is a diagram illustrating another exemplary chronology according to the present systems and methods.

FIG. 7 is a diagram illustrating another exemplary chronology 700 according to the present systems and methods. This chronology 700 shows that in some embodiments, the video recordings 502, 504, 506 may be rearranged. Audio controls 702 may allow the user to control the audio recordings played during the display of the chronology 700. The audio recordings may be synchronized with the video recordings and may be displayed with associated video recordings. For example, in the supply room video records 506, there may be one audio recording available nearby, so one audio control 702 is displayed, but in the front room video records 502, multiple audio controls 702 may be available to control the audio played back as the chronology 700 is reviewed. The audio controls 702 displayed may mute or un-mute the playback of different devices to allow the user to single out sounds recorded by certain audio recording devices. Other controls such as volume control or stereo control may also be implemented.

Playback and search controls 704 may also be associated with the chronology 700 to improve user experience and interaction with the chronology 700. Individual sensor data may also have playback controls 706 to quickly browse through sensor data associated with a specific sensor. This chronology 700 also shows how rows shown in the timeline 508 may be changed (e.g., the different employees shown 708, 710). These changes may be manually made by the reviewer or may be selected by the computing device (e.g., using an application module 120) based on an algorithm identifying relevant data signals to display, such as sensors being in the same zone or group, or sensor information following a predetermined or unusual pattern, as described elsewhere herein.

In some alternative embodiments, the video feeds may be represented in the timeline 508. A video feed may be represented by periodic frames from the video feed displayed in the timeline rows, such as frames where movement is detected. This may allow the user to visually scan through a large amount of video information without playing it back in whole.

Figure 8:
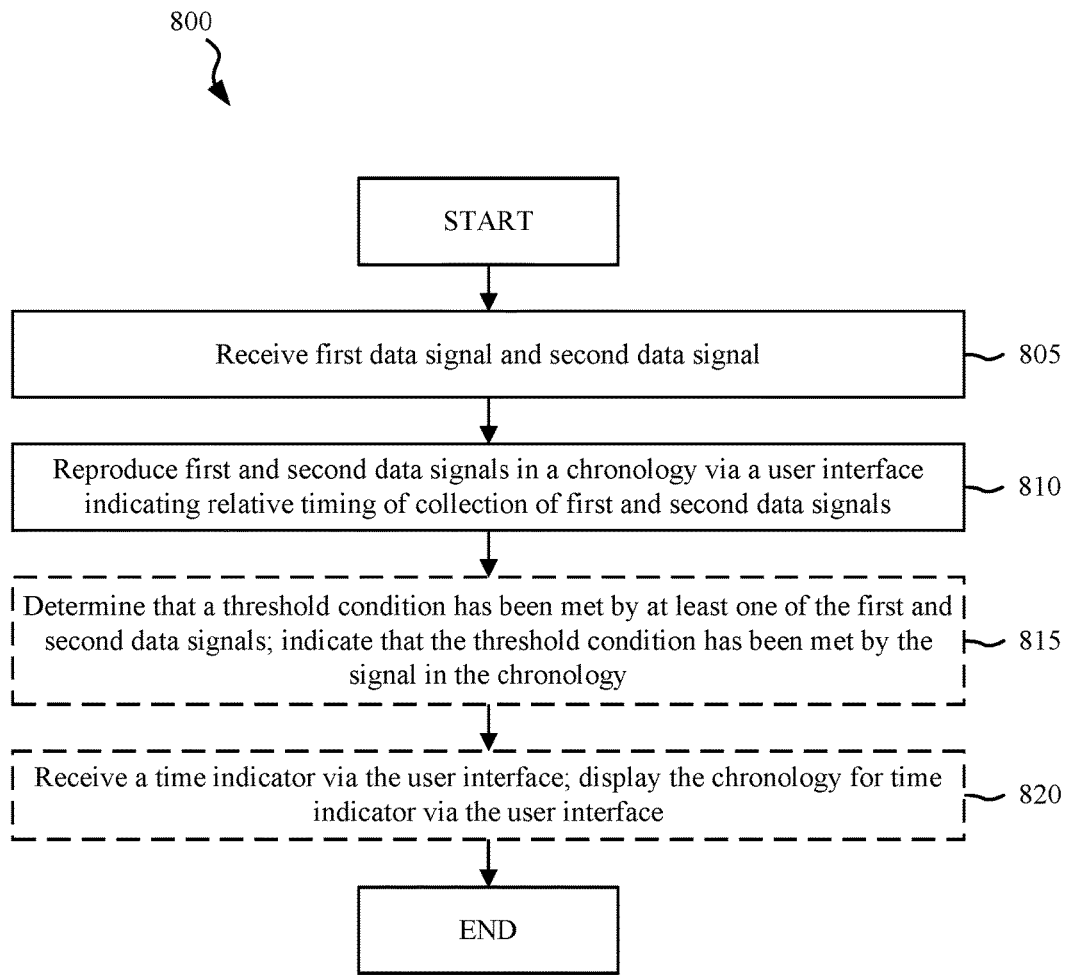
FIG. 8 is a flow chart showing a process according to the present disclosure.

FIG. 8 is a flow chart showing a process 800 according to the present disclosure. The process 800 may be performed using the devices 105 disclosed herein, such as by an application module 120 operating on a device 105 in a system 100, 200 of FIGS. 1 and/or 2. The process 800 begins when the device or module receives a first data signal and a second data signal in block 805. The receipt of the first and second data signals may be performed through a sensor interface (e.g., sensor interface 115 connected to network interface 210). Receipt of the first and second data signals may include storing or recording the data signals, such as by using a storage module 125 to save the signals to a memory means. The first and second data signals may be of different types and from different sensors. After receiving the first and second data signals, in block 810 the device or module may reproduce them in a chronology via a user interface indicating relative timing of the collection of the first and second data signals. For example, the data signals may be produced in a chronology such as chronology 500, 602, or 700 described above.

In some arrangements, the device or module may also perform block 815, wherein the device or module determines that a threshold condition has been met by at least one of the first and second data signals, then indicates that the threshold condition has been met by the signal in the chronology. The threshold condition may be the magnitude or frequency of one of the data signals. For example, if an audio recording device registers a sound level above a certain decibel level or if activity of a motion detector is detected too frequently at a typically slow time, the threshold condition may be reached. In the chronology, the sensor data displayed may indicate that the threshold condition has been reached by various means, such as, for example, by a highlighted color, shape, or icon, an audible alert, or another indication made in a similar fashion. In another example, a person or device may be detected at the location at an unusual time or in an unusual place. The indication may comprise an alert transmitted to a user such as via an email or simple messaging service (SMS) message informing him or her of the recorded threshold-reaching conditions. Bringing threshold conditions to users' attention may accelerate their browsing of recorded data signals or bring to their attention information that could otherwise be missed.

In some embodiments, the process 800 may include block 820, wherein the device or module may receive a time indicator via the user interface and the chronology is displayed for the time indicator via the user interface. The time indicator may be input from the user in response to a prompt from the user interface, or an unprompted input from the user, such as by selecting a time in a timeline (e.g., using the indicator 510 to select a time or span of time in timeline 508). The chronology displayed for the time indicator may provide various sensors and detectors that were active at the time indicated. In some cases, at least a portion of the first and second data signals received in and/or around the time indicator may be transmitted in response to receiving a time indicator via the user interface.

Figure 9:
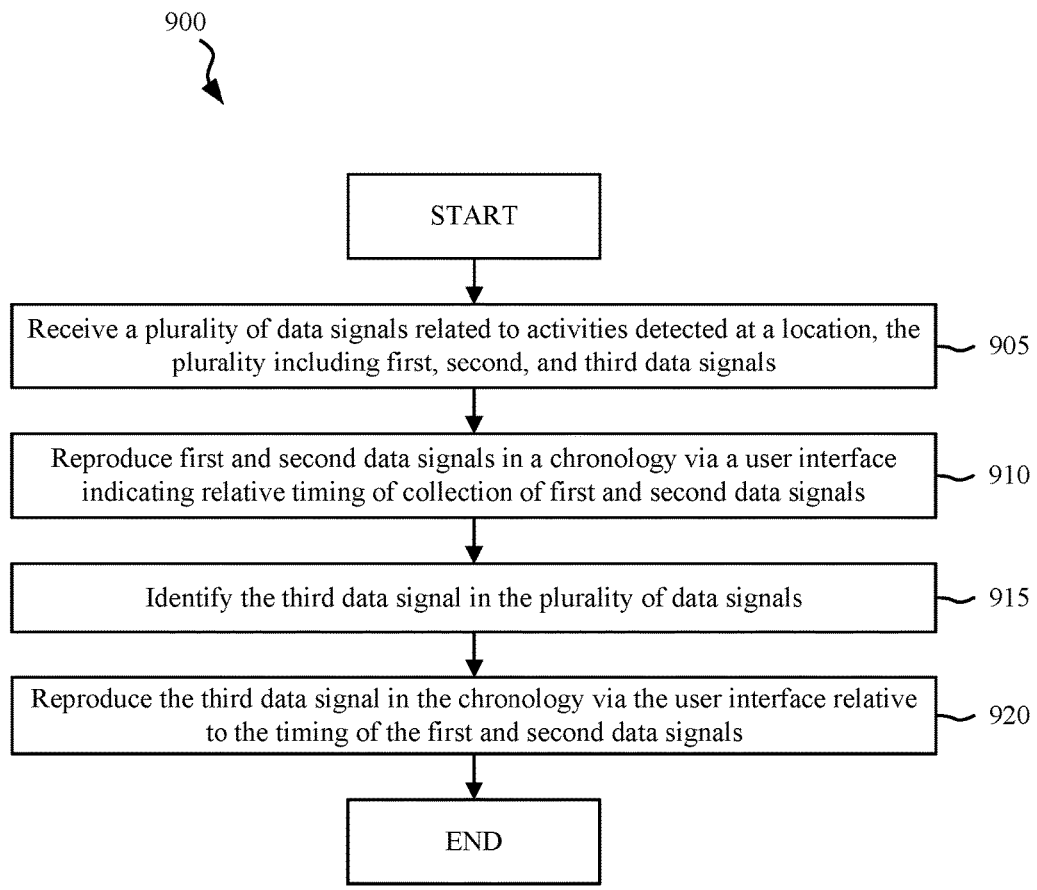
FIG. 9 is a flow chart showing another process according to the present disclosure.

FIG. 9 is a flow chart showing another process 900 according to the present disclosure. This process 900 may also be performed by a computing device or module. In block 905, the device or module receives a plurality of data signals related to activities detected at a location. The plurality of data signals may include at least three data signals: first, second, and third data signals. The signals may be received as described in connection with block 805.

In block 910, the device or module may reproduce the first and second data signals in a chronology via a user interface indicating relative timing of collection of the first and second data signals, similar to the performance of block 810. Next, the device or module may in block 915 identify the third data signal in the plurality of data signals. In some cases, this means that the user identifies a data signal from the plurality of data signals as the data signal he or she wishes to include with the first or second data signals in the chronology. The third data signal is then reproduced in the chronology via the user interface relative to the timing of the first and second data signals in block 920.

In some cases, the device or module may identify the third data signal from the plurality of data signals by detecting that the third data signal is in the same or a nearby zone when compared to the first and second data signals, by detecting that the activity sensed by the sensor providing the third data signal is heightened near the time that the first and second data signals are heightened, by reference to preferences of the user (e.g., the user indicated that that data signal would be important), or any other method that would indicate that the third data signal should be brought to the user's attention by including it in the chronology. Some of these other methods are discussed elsewhere herein.

A data signal may be reproduced via the user interface relative to timing of other data signals by bring shown in a timeline (e.g., timeline 508) or by being reproduced for the user in a manner reflecting the same times in which the signals were originally received. Thus, a first and second signal may be reproduced so that the first signal received at a point in time is reproduced concurrently with the second signal received at that point in time.

Figure 10:
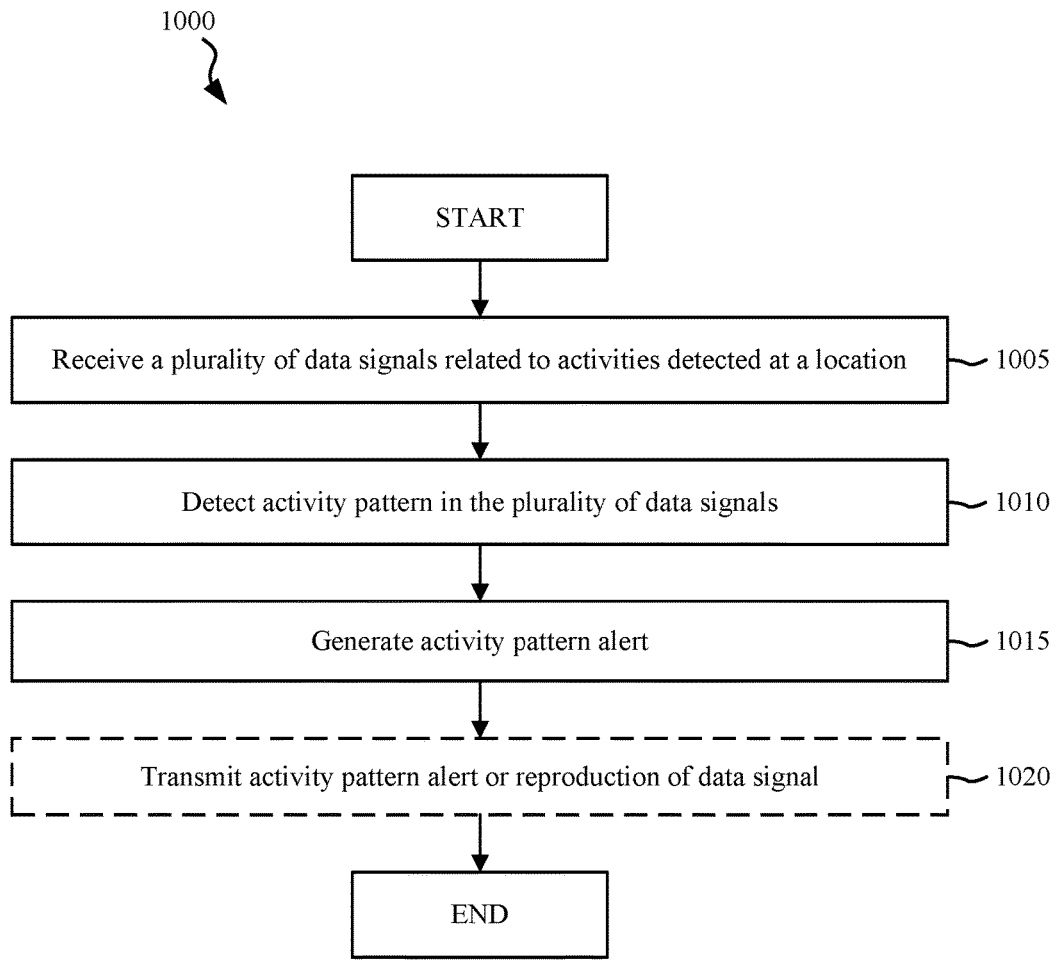
FIG. 10 is a flow chart showing a process according to the present disclosure.

FIG. 10 is a flow chart showing a process 1000 according to the present disclosure. This process 1000 begins when a device or module receives a plurality of data signals related to activities detected at a location in block 1005, similar to blocks 805 and 905. In block 1010, the device or module detects an activity pattern in the plurality of data signals. The activity pattern may comprise a pattern of activities performed in a specific order, such as the upset customer scenario described supra in connection with FIG. 4. The device or module may be configured to monitor or watch for this pattern to occur in the data signals received in block 1005.

In some embodiments, the activity pattern may be a sequence of changes in activity of one data signal, such as movement in a certain portion of a video camera recording or a pattern of activity occurring at an abnormal time. In response to detecting the activity pattern, the device or module may then generate an activity pattern alert in block 1015. The activity pattern alert may be an indication that a pattern has been detected, such as a message being displayed on the device or a message being transmitted in block 1020. In some embodiments, a reproduction of the data signal may accompany the transmitted activity pattern alert.

Figure 11:
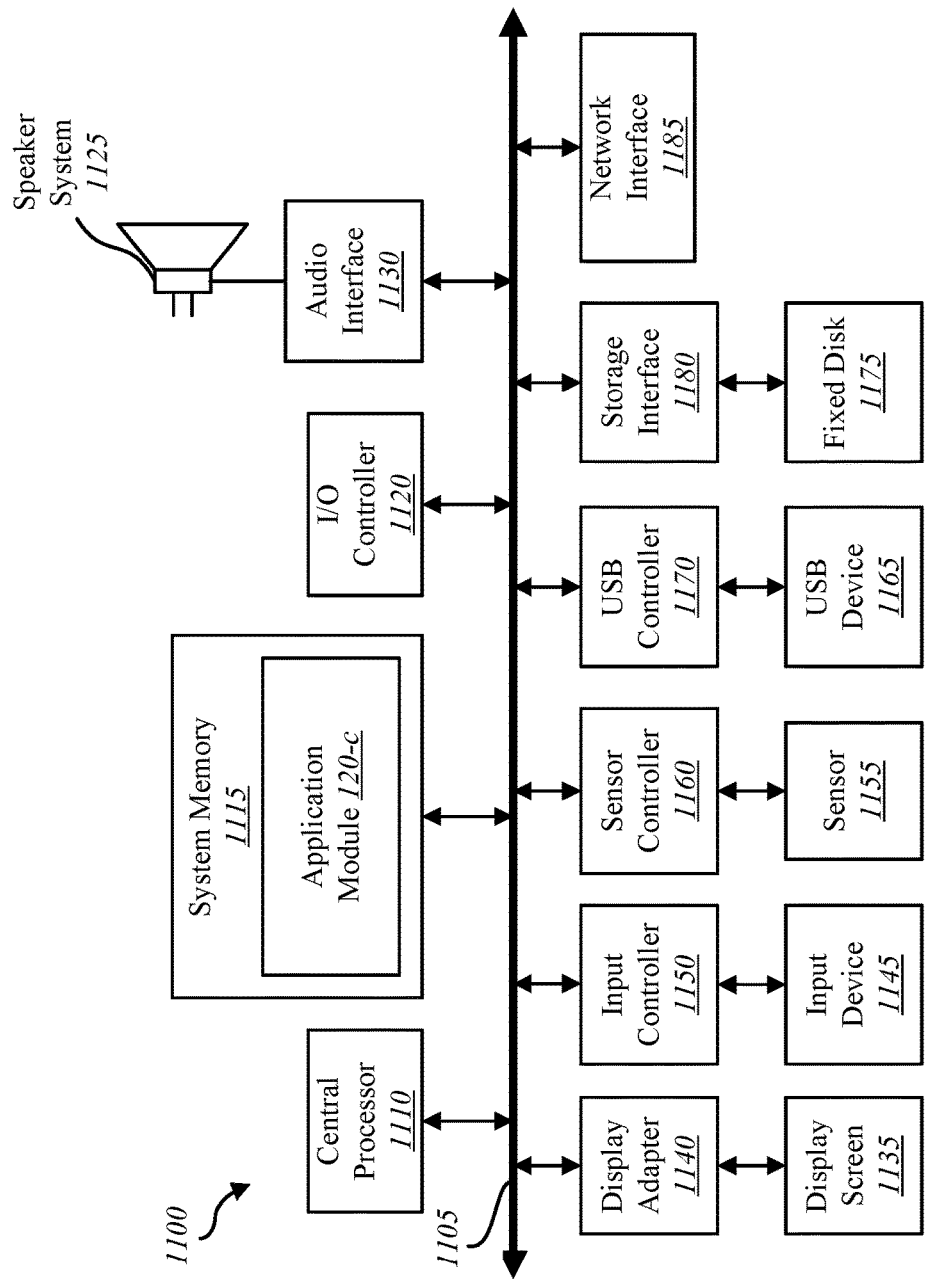
FIG. 11 is a block diagram of a computer system suitable for implementing some of the present systems and methods.

FIG. 11 is a block diagram of a computer system 1100 suitable for implementing some of the present systems and methods. Computer system 1100 includes a bus 1105 which interconnects major subsystems of computer system 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (interfaced with an input controller 1150), one or more universal serial bus (USB) device 1165 (interfaced with a USB controller 1170), and a storage interface 1180 linking to a fixed disk 1175. Also included is a sensor 1155 interfaced using a sensor controller 1160 (which may comprise, e.g., a sensor interface 115), and network interface 1185 (coupled directly to bus 1105) (which may be, e.g., network interface 210). A user interface 110 may comprise elements 1125, 1130, 1135, 1140, 1145, and 1150.

Bus 1105 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, an application module 120-c which may implement the present systems and methods may be stored within the system memory 1115. Applications resident with computer system 1100 are generally stored on and accessed via a non-transitory computer readable medium, such as a hard disk drive (e.g., fixed disk 1170), an optical drive (e.g., an optical drive that is part of a USB device 1155 or that connects to storage interface 1165), or other storage medium. These storage media may be embodied as computer program products. Additionally, applications can be in the form of electronic signals modulated in accordance with the application and data communication technology when accessed via network interface 1185.

Storage interface 1180, as with other storage interfaces of computer system 1100, can connect to a standard computer readable medium for storage and/or retrieval of information, such as a fixed disk drive 1175. Fixed disk drive 1175 may be a part of computer system 1100 or may be separate and accessed through other interface systems. A modem connected to the network interface 1185 may provide a direct connection to a remote server via a telephone link or to the Internet via an internet service provider (ISP). Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present systems and methods. The devices and subsystems can be interconnected in different ways from that shown in FIG. 11. The operation of a computer system such as that shown in FIG. 11 is readily known in the art and is not discussed in detail in this application. Code to implement the present disclosure can be stored in a non-transitory computer-readable medium such as one or more of system memory 1115, or fixed disk 1175. The operating system provided on computer system 1100 may be MS-DOS®, MS-WINDOWS®, OS/2®, UNIX®, Linux®, or another known operating system.

Moreover, regarding the signals and network communications described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:
1. A method for monitoring activity, comprising:
receiving visual data from a camera at a location;
receiving first non-visual data from a first activity detector at the location;
receiving second non-visual data from a second activity detector different from the first activity detector at the location;
outputting a chronology depicting at least a portion of the visual data, a first timeline representing the first non-visual data, and a second timeline representing the second non-visual data.

2. The method of claim 1, wherein each of the first timeline and the second timeline is associated with a distinct set of non-visual data.

3. The method of claim 1, wherein the first non-visual data comprises pressure data, motion data, radio frequency signal data, or a combination thereof generated by a single activity detector.

4. The method of claim 1, further comprising:
receiving an indicator indicating a time of receipt of the visual data and non-visual data, wherein outputting the chronology further comprises outputting a first portion of the visual data associated with the time indicated by the indicator.

5. The method of claim 1, further comprising:
determining that an activity level indicated by the first non-visual data satisfies a threshold; and
identifying an event based at least in part on the activity level of the first non-visual data satisfying the threshold.

6. The method of claim 5, wherein the first timeline includes an indication of the event.

7. The method of claim 5, further comprising:
identifying a portion of the visual data, first non-visual data, second non-visual data, or a combination thereof based at least in part on the activity level of the first non-visual data satisfying the threshold; and
outputting an indication of the identified portion as part of the chronology.

8. The method of claim 5, further comprising:
triggering real-time monitoring of the visual data, first non-visual data, second non-visual data, or a combination thereof based at least in part on the activity level of the first non-visual data satisfying the threshold, wherein outputting the chronology is based at least in part on triggering the real-time monitoring.

9. The method of claim 1, wherein the chronology indicates a relative timing of a receipt of the visual data, the first non-visual data, the second non-visual data, or a combination thereof.

10. An apparatus for monitoring activity, comprising:
a processor;
memory in electronic communication with the processor; and
instructions stored in the memory and executable by the processor to cause the apparatus to:
receive visual data from a camera at a location;
receive first non-visual data from a first activity detector at the location;
receive second non-visual data from a second activity detector different from the first activity detector at the location; and
output a chronology depicting at least a portion of the visual data, a first timeline representing the first non-visual data, and a second timeline representing the second non-visual data.

11. The apparatus of claim 10, wherein each of the first timeline and the second timeline is associated with a distinct set of non-visual data.

12. The apparatus of claim 10, wherein the first non-visual data comprises pressure data, motion data, radio frequency signal data, or a combination thereof generated by a single activity detector.

13. The apparatus of claim 10, wherein the instructions are further executable by the processor to cause the apparatus to:
receive an indicator indicating a time of receipt of the visual data and non-visual data, wherein outputting the chronology further comprises outputting a first portion of the visual data associated with the time indicated by the indicator.

14. The apparatus of claim 10, wherein the instructions are further executable by the processor to cause the apparatus to:
determine that an activity level indicated by the first non-visual data satisfies a threshold; and
identify an event based at least in part on the activity level of the first non-visual data satisfying the threshold.

15. The apparatus of claim 14, wherein the first timeline includes an indication of the event.

16. The apparatus of claim 14, wherein the instructions are further executable by the processor to cause the apparatus to:
identify a portion of the visual data, first non-visual data, second non-visual data, or a combination thereof based at least in part on the activity level of the first non-visual data satisfying the threshold; and
output an indication of the identified portion as part of the chronology.

17. The apparatus of claim 14, wherein the instructions are further executable by the processor to cause the apparatus to:
trigger real-time monitoring of the visual data, first non-visual data, second non-visual data, or a combination thereof based at least in part on the activity level of the first non-visual data satisfying the threshold, wherein outputting the chronology is based at least in part on triggering the real-time monitoring.

18. The apparatus of claim 10, wherein the chronology indicates a relative timing of a receipt of the visual data, the first non-visual data, the second non-visual data, or a combination thereof.

19. A non-transitory computer-readable medium storing code for monitoring activity, the code comprising instructions executable by a processor to:
receive visual data from a camera at a location;
receive first non-visual data from a first activity detector at the location;
receive second non-visual data from a second activity detector different from the first activity detector at the location; and
output a chronology depicting at least a portion of the visual data, a first timeline representing the first non-visual data, and a second timeline representing the second non-visual data.

20. The non-transitory computer-readable medium of claim 19, wherein each of the first timeline and the second timeline is associated with a distinct set of non-visual data.

\* \* \* \* \*